United States Patent [19]

Slater

[11] 3,960,320

[45] June 1, 1976

[54] COMBUSTION OPTIMIZER

[75] Inventor: Billy Ray Slater, Richardson, Tex.

[73] Assignee: Forney Engineering Company, Carrollton, Tex.

[22] Filed: Apr. 30, 1975

[21] Appl. No.: 573,279

[52] U.S. Cl. .......................... 236/15 B; 236/20 R; 235/150.1
[51] Int. Cl.² ............... G05D 23/20; G05B 24/02; F23N 1/02; F23N 5/24
[58] Field of Search ................... 236/15 B, 20; 235/150.1, 151.1; 431/90

[56] References Cited
UNITED STATES PATENTS

| | | | |
|---|---|---|---|
| 2,866,602 | 12/1958 | Dailey, Jr. et al. | 236/15 B |
| 3,284,615 | 11/1966 | Yetter | 235/150.1 |
| 3,483,552 | 12/1969 | Millar | 235/150.1 |

*Primary Examiner*—William F. Wayner
*Attorney, Agent, or Firm*—Marvin A. Naigur; John E. Wilson

[57] ABSTRACT

There has been provided an improved process control optimizer for regulating at least one parameter of the process relative to optimum utilization of available energy. Temperature responsive open loop control means regulates the fuel flow and the optimizer is operatively responsive to the fuel flow for regulating air flow for combustion of fuels such that the fuel air mixture is minimized. The improvement includes a means for delivering a digital output code for governing the air mixture in accordance with the optimum characteristic of the process and digitally responsive means receive said codes for decreasing air at a selected first rate and increasing air at a relatively faster second rate, the rates corresponding to respective reductions and increases in fuel flow about a selected optimum operating point.

12 Claims, 10 Drawing Figures

FIG. 1 — FURNACE CHARACTERISTIC (CONSTANT LOAD)

FIG. 2 — TYPICAL FURNACE CONTROL WITH OPTIMIZER

COMBUSTION OPTIMIZER

BACKGROUND OF THE INVENTION

The present invention relates to the optimization of fuel utilization in a fired heater or furnace system. There are optimizers available presently which control the ratio of fuel to air in a heater in accordance with optimum requirements and constraint variables such as temperature, pressure, and the like.

While the systems available presently operate in the manner intended, it is possible to improve the performance of such systems by converting to a digital control utilizing the change in the fuel flow rate as a controlling parameter by which the changes in fuel flow cause the optimizer to respond in such a way as to produce opening and closing rate signals for a damper control at varying rates in accordance with the system parameters.

The digital control provided by the present invention is intended to simplify and reduce the expense in providing a totally analog system for the control of a complex furnace system. A digital system for example, can handle a number of inputs simultaneously and select the one most closely resembling the requirements of the system constraints and furthermore can operate quickly and accurately utilizing digital counters and filters.

While the present disclosure discusses the utilization of fuel, it should be understood that the present system can be adapted to respond to various inputs for optimizing different process variables.

It is therefore an object of the present invention to provide a system for optimizing process variables of different kinds by utilizing digital system concepts.

For a better understanding of the present invention together with other and further objects thereof, reference is directed to the following description, taken in connection with the accompanying drawings, while its scope will be pointed out in the appended claims.

SUMMARY OF THE INVENTION

There has been provided an improved process control optimizer for regulating at least one parameter of the process relative to optimum utilization of available energy. Temperature responsive open loop control means regulates the fuel flow and the optimizer is operatively responsive to the fuel flow for regulating air flow for combustion of fuels such that the fuel air mixture is minimized. The improvement includes a means for delivering a digital output code for governing the air mixture in accordance with the optimum characteristic of the process and digitally responsive means receive said codes for decreasing air at a selected first rate and increasing air at a relatively faster second rate, the rates corresponding to respective reductions and increases in fuel flow about a selected optimum operating point.

DESCRIPTION OF THE PREFERRED EMBODIMENT

The optimizer of the present invention, when applied to a furnace, regulates air flow into the firebox in order to maintain the optimum ratio between air and fuel. In so doing, minimization of the amount of fuel necessary to supply the energy required to maintain fixed product temperature is accomplished.

The optimizer normally uses fuel flow as a measured process variable but the output of the temperature controller may also be used. The output signal of the optimizer is a control signal to position air dampers in the furnace. The optimizer closes the damper slowly in a linear (ramp) fashion until slightly fuel-rich condition occurs. Fuel-rich operation causes the temperature control to increase fuel flow in an effort to maintain product temperature. The optimizer detecting the increase in fuel flow, ramps open the damper a small amount. Fuel flow decreases in response to increased product temperature. At the same time, the optimizer moves the damper toward closed. The fuel flow thereafter increases as the fuel-rich condition is reached, and the cycle is repeated. Thus, the optimizer maintains furnace operation very close to the optimum operating point.

When optimizing a multicell (fuel flow) furnace having one common damper, only one cell can be optimized at any one instant in time. The other cell(s) will operate in the air-rich region. The optimizer of the present invention is designed with an input for each furnace cell to connect, via an OR gate, to a single output control section to position the damper; thus, the cell that is operating closest to the optimum ratio at any time controls the damper.

The optimizer operates by changing a process variable in a certain direction at a constant rate. This is a ramptype disturbance to the process, and the optimizer monitors the response of the process to the ramp disturbance.

By defining some constraint or limit in the process response, the optimizer can be made to reverse its action, i.e., reverse the direction of the ramp disturbance when the constraint condition is reached. Backing away from the constraint condition causes the optimizer to sense that the constraint condition no longer exists. When the optimizer detects this, it starts closing the damper again in its search for the constraint condition.

Furnace or heater optimization involves manipulation of the furnace secondary air damper or stack damper to obtain minimum fuel consumption while maintaining constant product temperature with a temperature controller. Fuel consumption is reduced because more efficient use is made of the existing fuel thus tending to increase product temperature. The temperature controller reduces fuel flow to maintain constant product temperature. By optimizing air flow into the heater, complete combustion occurs with minimum excess air, less heat energy is lost to the stack, and fuel consumption is minimized.

Figure 1:
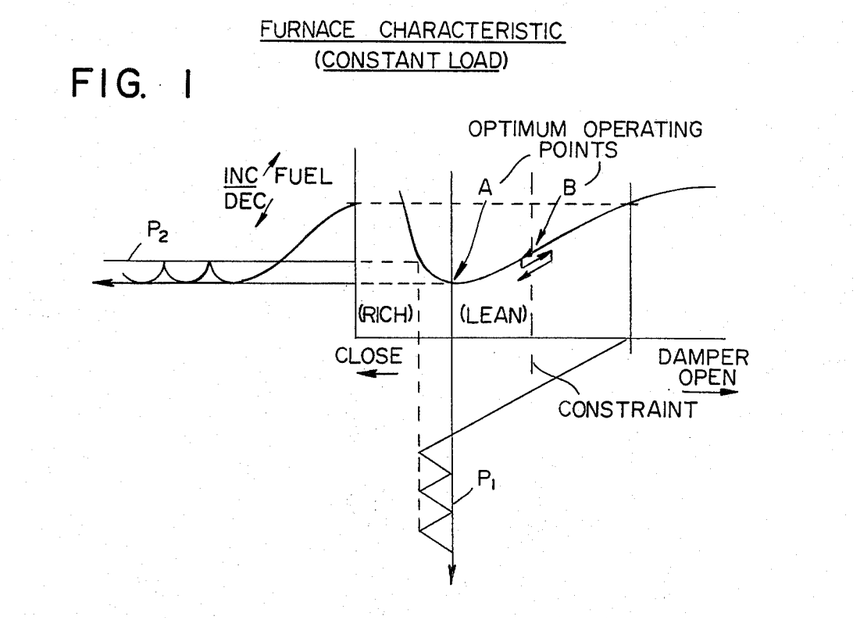
FIG. 1 is an illustration of a furnace characteristic relative to damper movement at constant load.
Figure 2:
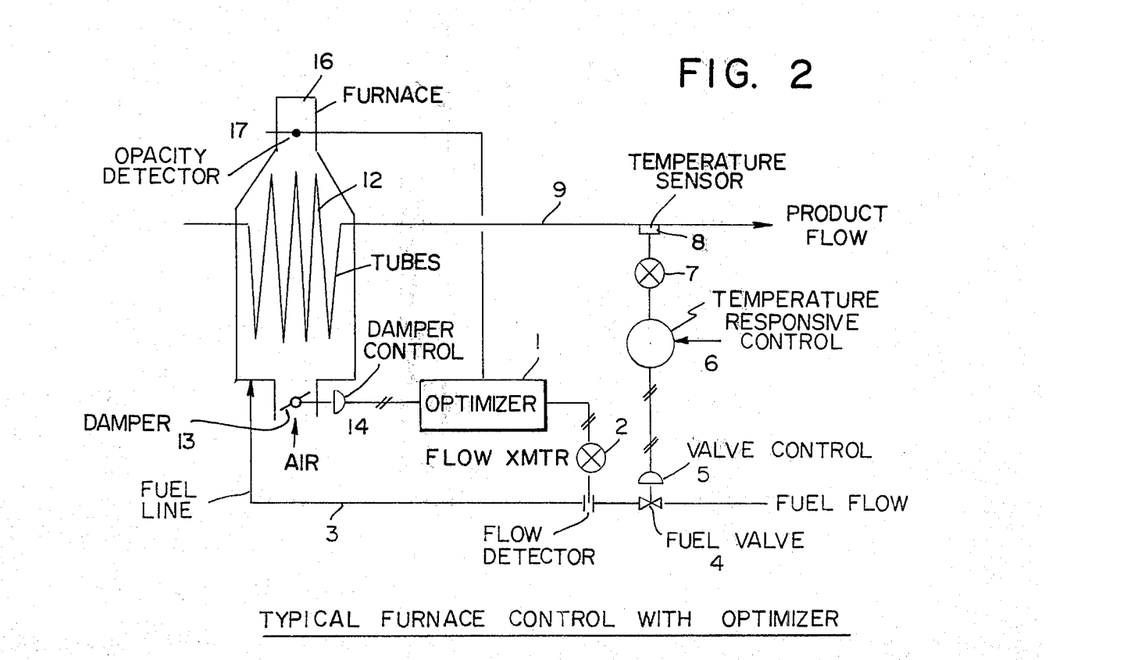
FIG. 2 illustrates control loops for a typical furnace control with optimizer.

FIG. 1 shows a plot of the relationship between damper position and fuel flow when product temperature is held constant and FIG. 2 shows the control loops for the system with appropriate labeling.

The damper is positioned by an output current or pressure signal from the optimizer. The signal is a ramp which moves the damper from an open position toward closed. The fuel flow decreases as the damper closes. This is a negative-going signal to the optimizer to which it does not respond.

As the damper closes beyond the optimum point (A) FIG. 1, product temperature decreases and sensor loop controlling fuel valve opens the fuel valve, (i.e. fuel flow increases in order to compensate). This increase in fuel flow is a positive-going signal to the optimizer to which it responds. As the damper continues to close beyond the optimum point (A), the fuel flow increases rapidly. The optimizer senses this increase. When the change is sufficiently large, the optimizer, reverses the damper movement, ramping it open.

At this time, the damper is positioned so the furnace is operating on the left or fuel-rich side of the optimum point. The opening damper causes an increase in product temperature which is compensated for by a decrease in fuel flow. The damper starts to close once again until the optimizer senses increasing fuel flow, starts opening the damper, and repeats the process. The resulting damper movement and fuel flow response with respect to time forms patterns $P_1$ and $P_2$ respectively around the damper position for optimum furnace operation.

The optimizer operates on a change, not on an absolute value of fuel flow. If process, furnace, fuel, or atmospheric conditions change, the optimum point shifts. As the fuel-air curve changes, the optimizer seeks and operates at a new optimum point.

The condition of increasing fuel flow can be caused by conditions other than optimizer action, such as increased furnace load; thus, it is desirable to ramp the damper open faster than to close it.

If there is an unusual increase in fuel flow, such as when the furnace feed flow is increased suddenly, the optimizer detects the large increase in fuel flow, a LIMIT is sensed and the damper is driven to a preset open limit condition. The LIMIT action prevents choking the furnace or putting unburned fuel into the firebox. Thus, there is no need for operator attention to damper actuation at times of large load changes since the optimizer seeks a new optimum point when the internal effects of the large fuel flow change have diminished.

The operator can assume manual control of the damper position by switching the system from AUTO-TO-MANUAL and adjusting the damper position with a suitable manual control device in percent closed. When in MANUAL, LIMIT and REVERSE actions are disabled, and the operator has complete control of damper position.

Facilities are provided for connecting external constraints to ramp the damper open on a signal other than the normal increasing fuel flow signal. Conditions such as Fuel Valve Wide Open, Temperature Controller on Manual Control, Furnace Tube Skin Temperature or Increasing Firebox Pressure and Opacity are examples of such external signals.

The optimizer is designed to indicate any of the aforementioned conditions as a CONSTRAINT, but to respond to each in a different manner. The Fuel Valve Wide Open condition and the temperature contoller on MANUAL causes the optimizer to open the damper to the PRESET OPEN position. High Furnace Tube Skin Temperature, Increasing Firebox Pressure, or Opacity, causes the optimizer to ramp the damper open and is more fully described hereafter. Electrical Power Failure or Instrument Air Failure, causes the optimizer to produce an output signal to open the damper fully. The Opacity constraint shifts the operating point from (A) to (B) and its particular operation shall be discussed in detail below.

General Operation

Having described the general concept of the present system, a typical cycle of the apparatus will be described.

Fuel cell or flow transmitter 2 delivers a signal to optimizer 1. The signal represents the fuel flow through fuel line 3 which is controlled by valve 4. The opening in the valve 4 is in turn controlled by actuator 5 which receives opening or closing signals from temperature responsive controller 6. The controller 6 has two inputs, namely set point, which is some temperature to be maintained and temperature transmitter input which receives temperature information from probe 8 from the product flow line 9. Fuel burned in the furnace, heats the product in tubes 12 to some desired product temperature which temperature is in turn controlled by the amount of fuel passing to the furnace through valve 4. Optimizer 1 receives a flow signal through transmitter 2 to control the damper 13 through controller 14.

Normally, the damper 13 would be set at some fixed position and the fuel flow would be controlled in order to regulate the temperature of the product output. As previously noted the curve of FIG. 1 describes the furnace operating characteristic at constant load. The operating point A is illustrative of a point on the curve representing minimum fuel flow vs. damper position. In other words, just enough air (optimum) is supplied to the furnace at point A to burn a minimum amount of fuel which will maintain the temperature of the furnace.

In operation, the damper 13 is caused by the optimizer 1 to constantly reduce the air entering through the damper 13. As the damper approaches the position represented at point A and closes beyond that point, the temperature of the furnace decreases because the furnace is operating in a fuel-rich region and there is insufficient air for combustion of the fuel to maintain the product temperature. The temperature detector 8 senses the decreasing temperature of the product line 9 and transmits a signal through transmitter 7 to the temperature responsive controller 6. The controller 6 in turn actuates the valve 4 through operator 5 so as to increase fuel flow. An increase in fuel flow would theoretically increase the temperature of the product in the furnace. Optimizer 1 receives a signal from flow transmitter 2 which indicates an increase in fuel flow. The optimizer sensing this increase controls the damper 13 so as to increase the air (damper 13 is ramped open in order to provide some excess air so that the fuel will burn more efficiently and thereby raise the temperature of the heater.) The increased temperature in the furnace is transferred to the product which is sensed by the probe 8 causing a reduction in the amount of fuel to the furnace. As the fuel flow signal stabilizes the damper, it is again driven towards closed driving the fuel air mixture into the rich region again. The fuel flow is increased, it is sensed by the optimizer which in turn opens the damper to continually repeat this cycle about the optimum operating point A.

In certain heaters, it is important to detect the Opacity of the smoke exiting through the stack 16. An Opacity detector 17 responds to the smoke in the stack 16 to generate a signal. If the opacity within the stack 16 is in excess of allowable smoke condition, the signal is conducted to the optimizer 1. As previously mentioned, this is one of the possible external constraints to the system which is illustrated in FIG. 2. The constraint moves the optimum operating point from A to B. While this condition requires the utilization of some excess air, it does promote a better burning characteristic for the fuel relative to the amount of smoke produced in the furnace. The system operates in the same manner with the operating point shifted. The constraint prevents the closure of the damper beyond the position B.

Figure 3:
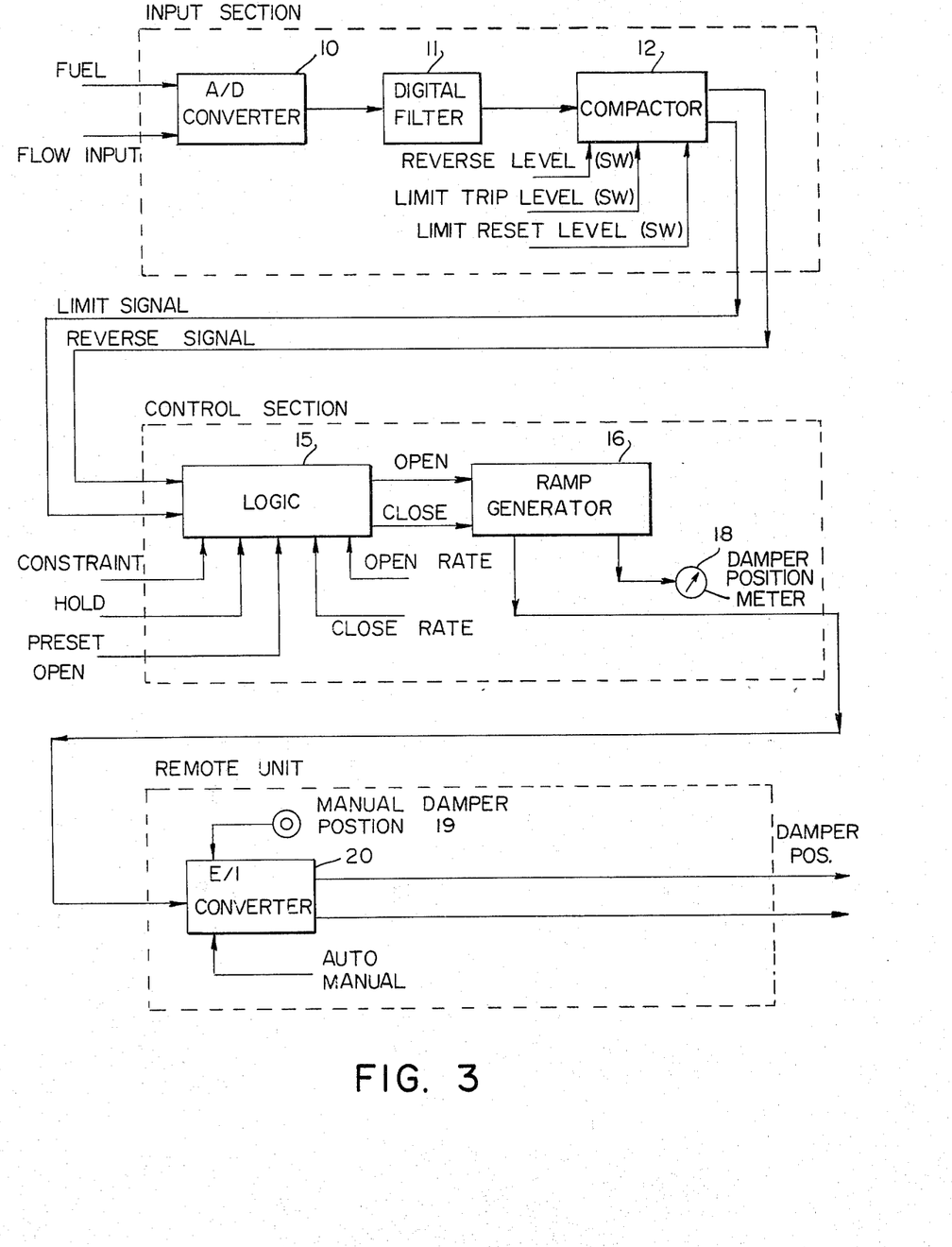
FIG. 3 is a block diagram of the optimizer with various inputs thereto.

Referring to FIG. 3, operation of the combustion optimizer 1 is described below.

The system receives a fuel flow input signal which is suitably buffered and filtered. The signal (analog) is fed to A/D converter 10 which produces a digital signal that represents fuel flow. The system is designed to respond only to increases in fuel so that the damper is normally closing in order to decrease the air/fuel ratio and approach the optimum operating point. When the fuel flow increases due to the damper having passed the optimum operating point, the system responds when the change in fuel flow (increase) approaches a certain fixed level (reverse level) so as to generate a signal which is read by the logic section 15 to ramp open the damper.

The fuel flow signal from the A/D converter 10 is conducted to digital filter 11 which detects only the positive change in the fuel flow (increase). This increase in fuel flow is delivered as a digital count to comparator 12. The comparator 12 has a number of inputs, each of which are preset by manual switches for controlling the comparator 12 output.

The REVERSE level is set such that comparator 12 produces an output when the fuel flow increases above an adjustable set point which is usually set by switch 43 to about 5 percent. When the input signal from filter 11 exceeds the reverse level set point, the comparator 12 senses a reverse to the control section which in turn produces an output for driving the damper ramp open.

The LIMIT TRIP LEVEL setting determines the level of signal out of the filter 11 that causes the LIMIT operation to occur. It should initially be set to alarm somewhere between 25 and 50 percent. The actual level chosen is a result of a system noise and operating experience and is set during initial turning of the optimizer. The control section, when energized by this circuit, produces an output which causes the damper to be driven to a position preset by the DAMPER PRESET OPEN input to logic 15.

The condition for LIMIT operation is a large increase in fuel flow. Once LIMIT operation has taken place and the damper is safely open, it is desirable to hold the damper in its safe position until the optimizer filter 11 has completed its response to the increased fuel flow transient signal. This prevents the damper from going further open from its safe position instead of immediately ramping toward a new optimum level. Normally, the indication that response is complete is the filter output returns toward zero volts from the large positive voltage that resulted from the increased fuel flow.

To hold the LIMIT condition, the LIMIT RESET LEVEL should be set to a smaller valve (4 percent) than the REVERSE LEVEL (5 percent). The LIMIT condition is then maintained until the filter output has gone closer to zero volt than the REVERSE level setting to the comparator 12.

The LIMIT and REVERSE signals are conducted to the control section as previously noted. The control section includes a logic block 15 which generates open and closed signals for driving a ramp generator 16. The ramp generator 16 produce signals which control the position of the damper through a remote unit and also a signal for driving meter 18.

Open and closed rate outputs of logic 15 determine the manner in which the damper is opened and closed. In general, safety requires that the damper should ramp open quickly. On the other hand, the closing rate is generally slow so that the system responses to minor variations is disregarded.

CONSTRAINT, HOLD and PRESET OPEN INPUTS to logic 15 determine certain limits of operation and overrides which shall be explained in further detail when appropriate.

The ouput from ramp generator 16 drives a converter 20 in the remote unit which actually produces a signal for driving the damper to the selected position. Auto/-Manual input to converter 20 is override for operator control.

INPUT SECTION

Figure 4A:
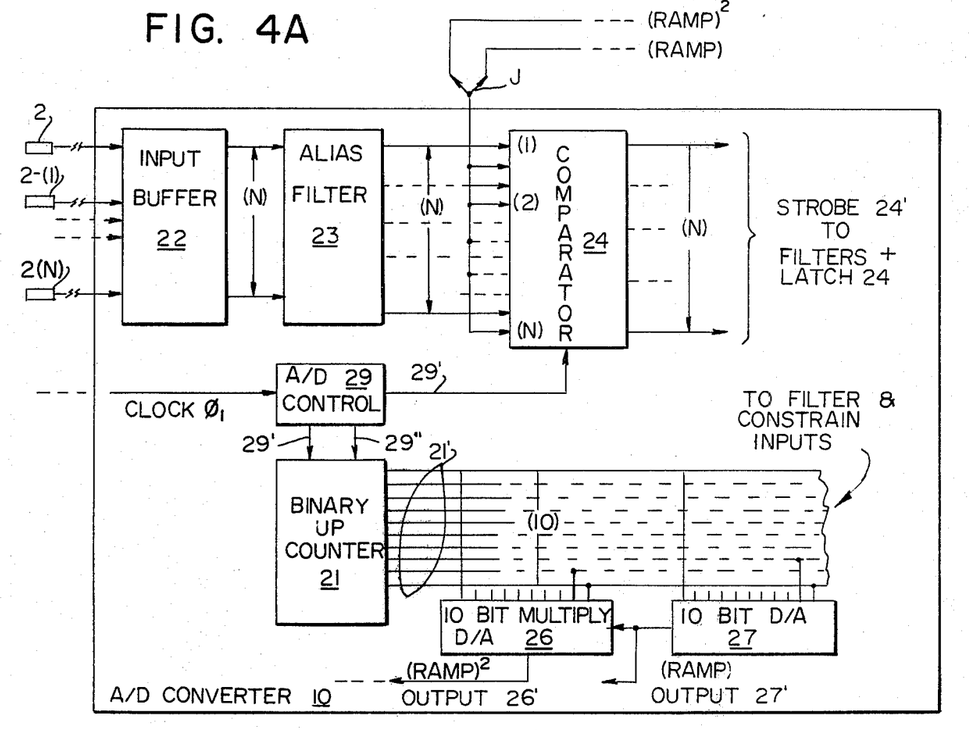
FIGS. 4A through 4G illustrate in partial block and schematic form the operation of the optimizer of the present invention.

Referring to FIG. 4A, a block and schematic diagram of a portion of the present invention is shown, namely analog to digital A/D converter 10. Input current or voltage representing fuel flow is converted to a 10-bit binary word in converter 10. A conversion start signal (Clock $\phi 1$) starts a 10-bit binary counter 21 counting up. This digital count of counter 21 is converted to an analog 0-to 10-volt signal in 10-bit converter 27 (00—0 counts = 0 volts and 11—1 counts = 10 volts). The input of cell 2, if a current, is converted to a 0-to 10-volt signal by input buffer 22 and then is applied to alias filter 23 which is a low pass antialias filter. When a linear (ramp) conversion is being made, the signal from the alias filter 23 is compared at 24 to the linear ramp output of D/A converter 27. When these two signals [input (2') and ramp (27')] are exactly equal, a comparator 24 sends a narrow strobe pulse to filter 11 (FIG. 4B) where a 10-bit latch (memory) 25 is located. This strobe places the present digital value of the counter 21 (lines 21') into the latch 25 in the filter 11.

A square root conversion is performed when using a pneumatic input (eg. gas venturi detector), by comparing a squared ramp (output 26') to the input signal (2') and then strobing the digital value of the linear (unsquared) ramp 21' to latch 25.

The conversion occurs when 10-bit multiplier D/A 26 multiplies the digital ramp (output 21' of counter 21) and the analog ramp (output 27' of converter 27). The digital ramp 21' times the analog ramp 27' in multiplier 26 equals a square ramp (27' × 21') input signal 26' to comparator 24. Since the digital ramp 21' and the analog ramp 27' are equal, then one can replace the other in the equation; therefore, the digital ramp 21' times the digital ramp 21' is equal to the square ramp 26' and the digital 21' ramp alone is equal to the square root of the square ramp 26' input signal. Comparison of an input ramp (2') with its square (26') in a comparator will yield the square root output when the two signals are equal. Either the linear 27' or the square ramp 26' can be selected by using jumpers J to comparator 24 for the appropriate input being used.

Figure 4B:
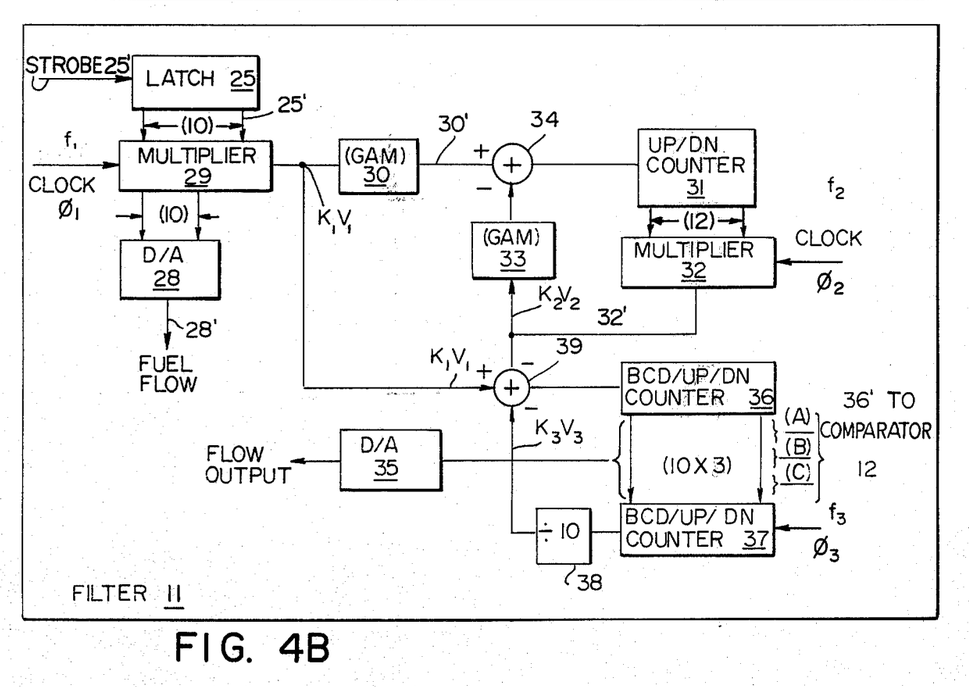

Referring to FIG. 4B, the 10-bit digital word stored in the latch 25 in filter 11 is converted through multiplier 29 to an analog signal by an 8-bit D/A converter 28 to provide an analog 0-to 10-vdc signal representing fuel flow for a pen recorder (not shown), and to provide an analog check on the A/D converter 10. The 10-bit digital word 25'' applied to a binary rate multiplier 29 is multiplied by clock rate (clock $\phi 1$). Output clock rate 29' of multiplier 29 is then divided by a Gain Adjust Multiplier (GAM) 30 which provides for gain adjustment of the filter 11. The clock rate output 30' of the GAM 30 is then applied to the input of a digital servo loop which includes a 12-bit counter 31, 12-bit multiplier 32, GAM 33 and summing node 34. The digital servo loop balances a clock rate generated in the servo loop against the input clock rate 30'. The response 32' of the servo loop determines the higher frequency pole of the filter 11. The clock output of the servo loop is applied to a second servo loop at node 39 which includes 3 decade BCD counter 36, 3 decade BCD multiplier 37, divide by 10 circuit 38 and the node 39, which determines the lower frequency pole of the filter 11. The output of 36' of the second servo loop is the filter 11 output. This output 36' is converted at D/A 35 to a 0-to 10-volt signal for use with the pen recorder.

Figures 4C, 4F:
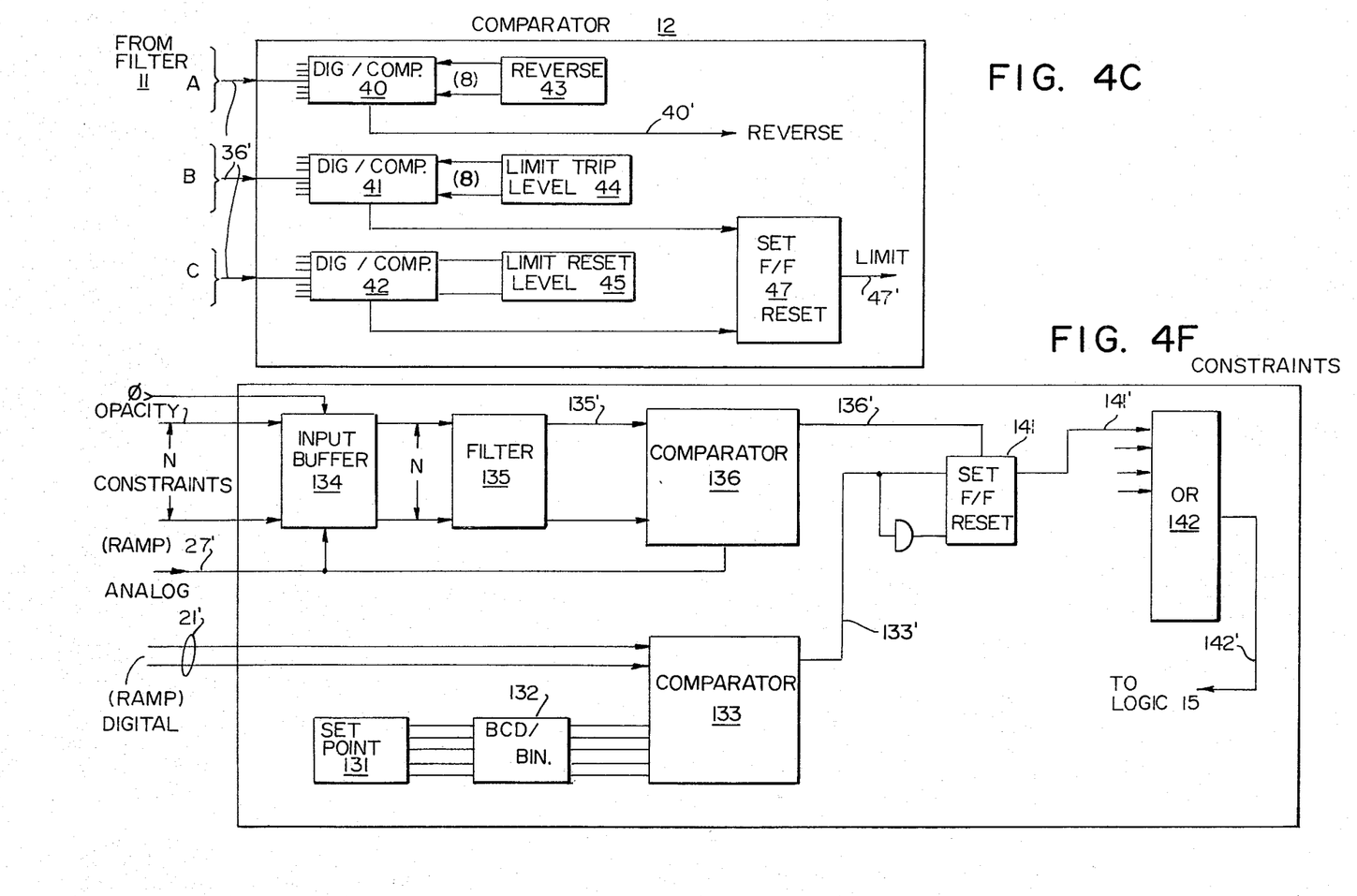

FIG. 4F shows the relationship of the elements of filter 11. The following is a mathematical analysis of the filter which will provide a derivation of the transfer function of the filter which can be used to determine its frequency response characteristic.

$$\text{Let } K = \frac{f}{2^n}$$
$$V_2 = K_1 V_1 - K_2 V_2$$

where $n$ = number of bits
$f$ = input frequency
$K$ = multiplier constant
$V_1$ = input voltage
$V_2$ = voltage of counter 31 taking the Laplace transfer $$V_2 = 1/S \; [K_1 V_1 - K_2 V_2] \qquad (1)$$

similarly $V_3$ the voltage of counter 36 may be expressed $$V_3 = 1/S \; [K_1 V_1 - K_2 V_2 - K_3 V_3] \qquad (2)$$

solving (2) for $V_3$ $$V_3 = V_1 \frac{[K_1(S+K_2) - K_1 K_2]}{(S+K_2)(S+K_3)}$$

and the transfer function $V_3/V_1$ may be expressed:

$$\frac{K_1 S}{(S+K_3)(S+K_2)}$$

Let $K_1 = K_2$ and solve for $f_2$ and $f_3$ which are the upper and lower poles of the filter response.

In FIG. 4C, the output 36' of the filter 11 is conducted to comparator 12 and compared at inputs 40, 41 and 42 with the REVERSE, LIMIT TRIP and LIMIT RESET LEVEL SET by respective switches 43, 44 and 45. When the filter 11 output 36' exceeds the REVERSE level 40, a REVERSE lamp (see control logic lamps) is illuminated and a logic signal 40' is sent to the control logic 15 over line 40' to start the damper opening. When the LIMIT TRIP LEVEL 44 is exceeded, a flip-flop 47 is set over line 41', a LIMIT (lamp) illuminates and a DAMPER PRESET OPEN signal is sent to the logic control 15 over line 47'. This flip-flop 47 stays set until the filter output 11 goes below the LIMIT RESET LEVEL at switch 45. The flip-flop 47 is then reset over line 42' and the LIMIT signals are removed from the comparator 12 output.

CONTROL SECTION

Figure 4D:
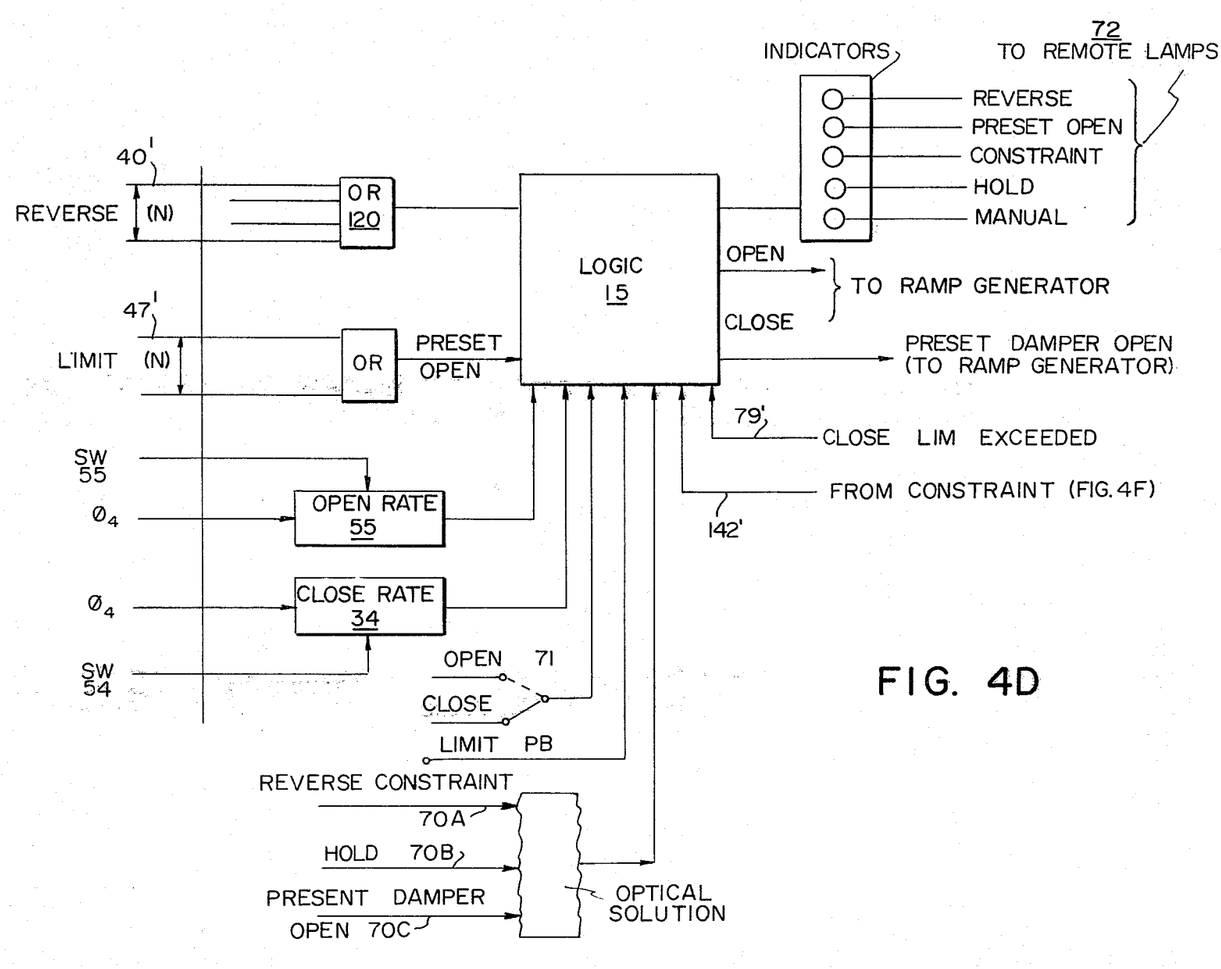
Figure 4E:
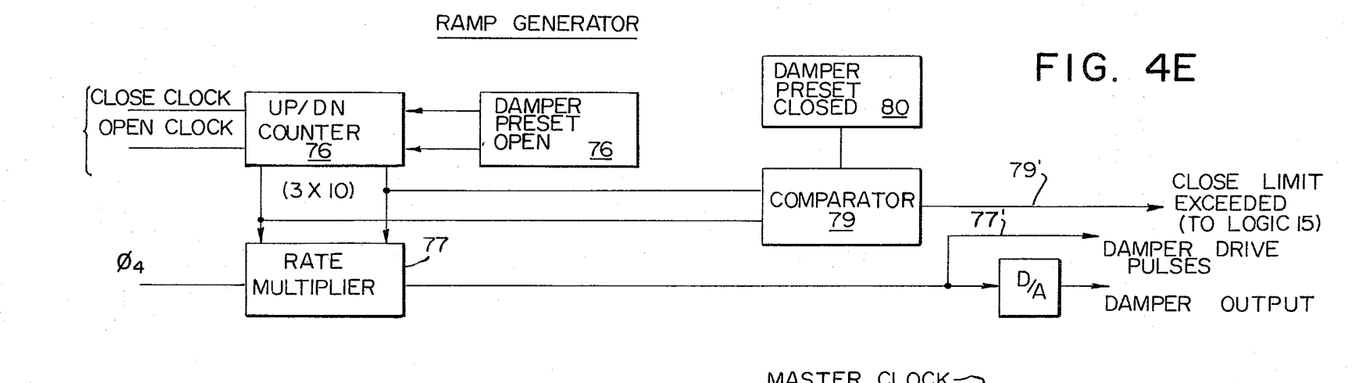

The control logic 15 (see FIG. 4D) receives: reverse signal 40' and limit signal 47' from comparator 12 of the input section for each cell 2-2N. In addition, CONSTRAINT, HOLD and PRESET DAMPER OPEN; and the external switch inputs are also conducted to logic 15 as illustrated. Control logic output signals at 55' and 53' are open and close pulse rates to control ramp generator 16 (FIG. 4E).

When no abnormal signals are received, the pulse rate 54' from a CLOSE RATE Block 54 controlled by a CLOSE RATE switch SW 54 and clock input $\phi 4$ is gated to the ramp generator 16 through logic 15. The output 54' closes the damper at a linear rate as determined by the CLOSE RATE switch SW 54. When a REVERSE signal is received from the comparator 12, the pulse rate 55' from an OPEN RATE Block 55, controlled by the OPEN RATE switch SW 55 and clock $\phi 4$ is gated to the ramp generator 16 to open the damper.

Constraint input to logic 15 are converted and used to open the damper at the rate determined by the OPEN RATE switch. If a reverse signal (open) is received after a constraint (contact closure or analog), the reverse signal is ignored; the constraint is the only signal acted upon. This prevents the damper from going wide open when a constraint is reached before the minimum fuel flow is reached. The fuel flow will increase when the damper is opening due to a constraint and this will cause the reverse signal to be generated by the filter 11. If this reverse signal were not ignored, the damper would go wide open as shown by the graph in FIG. 1. The damper opens in this manner only when the constraint occurs before the reverse occurs. If the reverse occurs before the constraint, the circuit operates in the normal fashion.

The HOLD input 70B automatically stops the opening and closing of the damper. This is used to freeze the damper at the present position when the fuel valve goes wide open rather than close the damper as would be expected. The PRESET DAMPER OPEN input 70C performs the same function as the LIMIT signal from the filter 11. Each immediately causes a signal to be outputed from the control logic 15 which opens the damper to the value set in on the DAMPER PRESET OPEN switch 75 on the ramp generator 16.

OPEN/CLOSE switch 71 to the control logic 15 gates a 120 Hz signal either to the open or close inputs of the ramp generator 16 through logic 15. This causes the ramp generator 16 to slow open or to slow close at rate of 12 percent per second.

The control logic also has lamp drivers 72 for lamps labeled on its own front panel (not shown) and lamps (not shown) at the remote unit.

The ramp generator 16 (FIG. 4E) outputs the damper position stored in a 3-decade, up-down counter 76. Fully open is a 0000 0000 0000 count and fully closed is 1001 1001 1001 count. The output 77' of the ramp generator 16 is a variable duty cycle pulse train generated by a 3-decade rate multiplier 77 which is controlled by the damper position counter 76. The clock to this rate multiplier is generated in clock $\phi 4$ of FIG. 4G or any other available clock source. These variable duty cycle damper position pulses are demodulated by a D/A circuit 78 to provide a 0-to 10-volt analog signal 78' for a pen recorder not shown.

When the LIMIT condition exists, the DAMPER PRESET OPEN external contacts 70C are closed, or the power is initially turned on, the value in the DAMPER PRESET OPEN switch 75 is gated into the damper position counter 76. The damper position output 76' in the 3-decade counter is continually compared at 79 to the value in DAMPER PRESET CLOSED switch 80. When the damper position equals or exceeds the value in the switch 80, a close LIMIT exceeded signal 79' is outputed which acts in the same manner as an external constraint. This signal causes the control logic 15 to count the counter 76 down over line 55' which, in turn, opens the damper to a flue just slightly smaller than the DAMPER PRESET CLOSED switch 80. The damper then starts to close again and the cycle repeats if no other factors (increasing fuel flow or an external constraint) occur.

As previously mentioned with regard to FIGS. 1 and 2, there are external constraints which are possible for changing the optimum operating point in accordance with restrictions as to the opacity of the smoke passing out of the furnace stack. One such constraint is illustrated in FIG. 4F. Any number N of constraints can be set for this device. However, the opacity 17' will be described as an illustrative example.

Set point switch 131 sets some value for constraint. It is converted to a binary coded decimal signal at 132 and placed as an input to comparator 133. Digital ramp 21' from A/D converter 10 (FIG. 4A) is coupled to inputs of comparator 133 to provide a digital comparison of a digital ramp (21') and set point 132' to provide an input to AND gate 137.

An input signal 17' from opacity detector 17 (FIG. 2) is conducted to analog input buffer 134. The analog signal 134' from the buffer 134 is conducted to analog filter 135 which provides an output 135' to analog comparator 136. The comparator 136 receives the analog ramp signal 27' from the A/D converter circuit 27' (FIG. 4A). When the opacity signal 135' equals the ramp 27' comparator 136 generates a momentary clock input 136' to FF 141. If the digital ramp 21' is greater than set point switch 131 then comparator 133 provides a signal to set FF 141. If the ramp 21' is less than set point 131, then FF 141 is set low.

OR gate 142 provides an input for control logic 15 through line 142' to the constraint input appropriately labeled at control logic block 15. This input causes the control logic 15 to prevent further closure of the damper so that the opacity as determined by the set point switch 131 is not exceeded.

It should be clear that other inputs or OR gate 142 may be provided by parallel inputs of other detectors, (eg. tube temperature exceeded, etc.) Naturally the constraint reached first will enable OR gate 142 to drive the constraint logic for control logic 15.

Figure 4G:
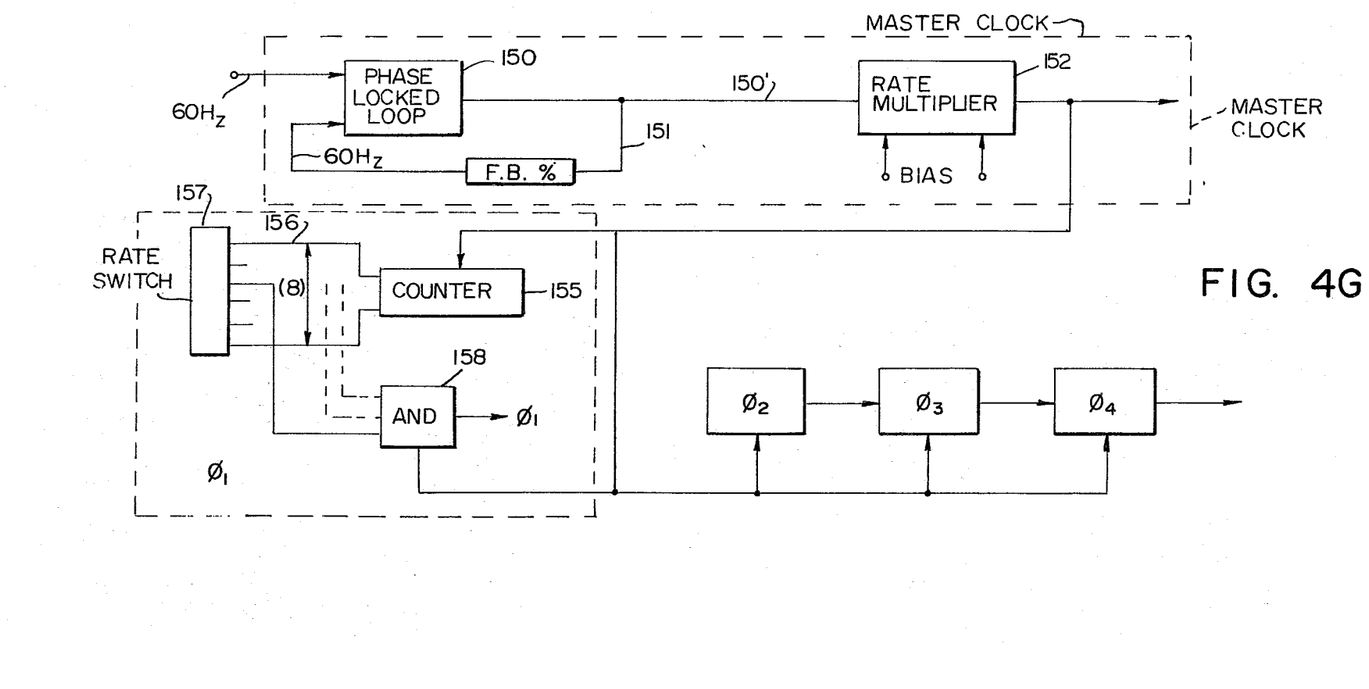

FIG. 4G illustrates a master clock which includes a phased locked loop 150 which receives a standard 60 Hz signal and converts the signal into a regulated output rate at 150', utilizing feedback loop 151. Rate multiplier 152 produces a master clock output for driving $\phi 1$, $\phi 2$, etc. counters shown in the illustration. For example, counter 155 has inputs 156 which are controlled by rate switch 157. The inputs 156 to counter 155 are also coupled to AND gate 158 such that when the counts of the counter 155 and the rates which 157 agree and gate 158 produces pulse rate $\phi 1$. Both the counter 155 and the AND gate 158 are driven by the rate multiplier 152 so that they are in synchronism. Clocks $\phi 2$ etc. operate in a similar fashion except that the rate switch 157 in clock $\phi 1$ is set to a different clock rate.

The system of the present invention provides a compact digital switch which is precise in its operation for controlling the damper position in a heater or furnace in order to optimize the amount of fuel utilized for a specific temperature requirement. Further, there is provided a system which has versatility because different parameters may be readily changed because of the digital design of the system.

While there has been described what at present is considered to be the preferred embodiment of the present invention, it will be obvious to those skilled in the art that various changes and modifications may be made therein without departing from the invention and it is intended in the appended claims to cover all such changes and modifications as fall within the true scope and spirit of the present invention.

I claim:

1. An improved process control and optimizer for regulating at least one parameter for the process relative to optimal utilization of available energy wherein temperature responsive open loop control means regulates fuel flow and the optimizer is operatively responsive to the fuel flow for regulating air flow for combustion thereof such that the fuel air mixture is minimized in accordance with optimum operating characteristics for a selected temperature of the process wherein the improvement comprises:

means for delivering digital output representative of the change of fuel flow for governing the air mixture in accordance with said optimum characteristic of the process, and means responsive to said output for decreasing air at a selected first relatively slow rate and increasing air at a relatively faster second rate, corresponding to respective reductions and increases in fuel flow about a selected optimum operating point.

2. The process control of claim 1 wherein a detector means is operative to be responsive to fuel flow and delivers an analog fuel flow signal corresponding thereto, and said optimizer includes analog to digital converter means producing a digital representation of said analog input.

3. The process control of claim 2 wherein said analog to digital converter includes; a counter operative for producing a plurality of output pulses at a selected rate corresponding to a reference signal of increasing magnitude and comparator means responsive to the reference and the analog fuel flow signal for producing a pulse when the reference and analog signals are equal, storage means operatively coupled to the counter and comparator, responsive to the pulse for storing the counts corresponding to the value of the analog fuel flow signal representing the digital value of the fuel flow for each comparator pulse.

4. The process control of claim 3 further including a digital filter operatively coupled to the storage means and responsive to fluctuations of the stored counts therein for producing a corresponding digital count output representing the fluctuations within a selected relatively low frequency band pass indicative of the fluid flow.

5. The process control of claim 4 wherein the digital filter includes digital servo loop means for establishing an upper and lower frequency response, a plurality of counters and corresponding parallel rate multipliers for each counter, the servo loop responsive to the the filter output and its own feedback, the loop having an input/output relationship proportional to output pulse rates for each multiplier.

6. The process control of claim 5 wherein the digital servo loop means includes two loops one each establishing respective upper and lower frequency response of the filter so as to establish a band pass for the filter.

7. The process control of claim 6 wherein the filter has a general frequency response of:

$$\frac{SK_1}{(S+K_2)(S+K_3)}$$

where $K_1$, $K_2$ and $K_3$ are frequency dependent multiplication constants in a Laplace transform for the filter.

8. The process control of claim 7 wherein the servo loops defining the upper and lower frequency response of the filter corresponding to multiplication constants $K_2$ and $K_3$ for each loop respectively.

9. The process control of claim 8 wherein multiplication constants $K_1$, $K_2$ and $K_3$ are frequency related according to the formula $K = f/2^n$ where $n$ is the number of bits for a counter and $f$ is the input frequency.

10. The process control of claim 9 wherein f is proportional to a digital clock input $\phi$ for each multiplier respectively.

11. The process control of claim 3 wherein the reference signal is a digital ramp; and a digital to analog converter receives said ramp for input to said comparator in analog form.

12. The process control of claim 11 wherein a multiplier circuit receives the analog ramp and the digital ramp to produce an analog form of the ramp signal squared, for input to said comparator, the analing input to the comparator representative of fuel flow being proportional to the square of fuel flow.

* * * * *

UNITED STATES PATENT AND TRADEMARK OFFICE
CERTIFICATE OF CORRECTION

PATENT NO. : 3,960,320
DATED : June 1, 1976
INVENTOR(S) : Billy Ray Slater

It is certified that error appears in the above-identified patent and that said Letters Patent are hereby corrected as shown below:

<u>In the Specification:</u>

<u>On ABSTRACT page, right hand column, line 17,</u> change "receive" to --receives--, and also change "codes" to --code--.

<u>Column 1, line 37,</u> before "DESCRIPTION" insert --BRIEF--.

<u>Column 1, line 64,</u> change "receive" to --receives--.
<u>Column 1, line 65,</u> change "codes" to --code--.
<u>Column 2, line 1,</u> before "DESCRIPTION" insert --DETAILED--.

<u>Column 2, line 22,</u> after "toward" insert --its--.
<u>Column 2, line 22,</u> after "closed" insert --position--
<u>Column 2, line 32,</u> change "to" second occurrence) to --with--.

<u>Column 4, line 17,</u> after "and" insert --a-- and after "transmitter" insert --7--.
<u>Column 4, line 59,</u> after "stabilizes" insert --,--.
<u>Column 4, line 60,</u> delete the comma after "damper" and delete "it".

<u>Column 5, line 1,</u> after "of" insert --an--.
<u>Column 5, line 11,</u> after "damper" insert --much--.
<u>Column 5, line 40,</u> delete "a reverse to" and insert --and conducts a signal to--.
<u>Column 5, line 43,</u> after "the" insert --output-- and delete "of signal out".
<u>Column 5, line 47,</u> change "turning" to --tuning--.
<u>Column 5, line 60,</u> after "is" insert --that--.
<u>Column 5, line 67,</u> change "volt" to --voltage--.
<u>Column 6, line 5,</u> change "produce" to --produces--.
<u>Column 6, line 21,</u> before "override" insert --an--.
<u>Column 6, line 63,</u> after "linear" insert --ramp--.
<u>Column 7, line 23,</u> change "4F" to --4B--.
<u>Column 8, line 24,</u> change "input" to --inputs--.

UNITED STATES PATENT AND TRADEMARK OFFICE
CERTIFICATE OF CORRECTION

PATENT NO. : 3,960,320                    Page 2 of 2
DATED : June 1, 1976
INVENTOR(S) : Billy Ray Slater It is certified that error appears in the above-identified patent and that said Letters Patent are hereby corrected as shown below:

Column 9, line 67, change "rates which" to --rate switch--.

In the Claims:

Column 12, line 1, change "corresponding" to --corresponds--.

In the Drawings:

Sheet 3, FIG. 4B, the reference numeral "25" following "STROBE" should read --21'--.

Sheet 4, FIG. 4C, the reference numeral 41' should be applied to the line extending between "DIG/COMP 41" and "SET F/F 47 RESET", also the reference numeral 42' should be applied to the line extending between "DIG/COMP 42" and "SET F/F 47 RESET".

Sheet 4, FIG. 4F, the reference numeral 17' should be applied to the "OPACITY" input line to "INPUT BUFFER 134"; reference numeral 134' should be applied to lines extending between "INPUT BUFFER 134" and "FILTER 135"; reference numeral 132' should be applied to the lines extending between "BCD/BIN" and "COMPARATOR 133"; and reference numeral 137 should be applied to the gate element associated with "SET F/F RESET 141".

Sheet 5, FIG. 4D, reference numeral 55' should be applied to "OPEN" line "TO RAMP GENERATOR" from "LOGIC 15"; reference numeral 53' should be applied to "CLOSE" line to "PRESET DAMPER OPEN"; and reference numeral 54' should be applied to the line from "SW 54" TO "CLOSE RATE 34".

Signed and Sealed this

Fifteenth Day of February 1977

[SEAL]

Attest:

RUTH C. MASON
Attesting Officer

C. MARSHALL DANN
Commissioner of Patents and Trademarks